(12) United States Patent
Kitahata et al.

(10) Patent No.: US 11,565,687 B2
(45) Date of Patent: Jan. 31, 2023

(54) CONTROL DEVICE OF HYBRID VEHICLE

(71) Applicant: TOYOTA JIDOSHA KABUSHIKI KAISHA, Toyota (JP)

(72) Inventors: Takeshi Kitahata, Toyota (JP); Hiroki Kuwamoto, Toyota (JP); Kenji Miyasaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 355 days.

(21) Appl. No.: 16/865,628

(22) Filed: May 4, 2020

(65) Prior Publication Data

US 2020/0361442 A1  Nov. 19, 2020

(30) Foreign Application Priority Data

May 15, 2019 (JP) .............................. JP2019-092481

(51) Int. Cl.
*B60W 20/10* (2016.01)
*B60W 10/06* (2006.01)
(Continued)

(52) U.S. Cl.
CPC ............ *B60W 20/10* (2013.01); *B60W 10/06* (2013.01); *B60W 10/08* (2013.01); *B60W 10/10* (2013.01);
(Continued)

(58) Field of Classification Search
CPC ...... B60W 20/10; B60W 10/06; B60W 10/08; B60W 10/10; B60W 10/12; B60W 2510/08; B60W 2710/083; B60W 20/15; B60W 30/20; B60W 10/26; B60W 20/20; B60W 30/182; B60W 2510/0638;
(Continued)

(56) References Cited

U.S. PATENT DOCUMENTS

2012/0029748 A1  2/2012 Kozarekar et al.
2016/0347305 A1  12/2016 Oyama
(Continued)

FOREIGN PATENT DOCUMENTS

JP  2016-222088 A  12/2016
JP  2016-222090 A  12/2016

*Primary Examiner* — Brian P Sweeney
(74) *Attorney, Agent, or Firm* — Oblon, McClelland, Maier & Neustadt, L.L.P.

(57) ABSTRACT

A control device of a hybrid vehicle includes a pressing torque applying portion configured to control the first rotating machine to output a pressing torque acting in a predetermined backlash elimination direction in backlash elimination in which one of tooth surfaces of meshing gears is pressed against the other at a meshing portion during motor running, so that the pressing torque is applied on the electric transmission mechanism. When an electrical angle of the first rotating machine is within a predetermined electrical angle range in which a cogging torque of the first rotating machine generated in accordance with rotation of the first rotating machine is equal to or greater than a predetermined torque required for the backlash elimination in the predetermined backlash elimination direction, the pressing torque applying portion makes the pressing torque smaller as compared to when the electrical angle is outside the predetermined electrical angle range.

18 Claims, 7 Drawing Sheets

(51) Int. Cl.
*B60W 10/08* (2006.01)
*B60W 10/10* (2012.01)
*B60W 10/12* (2012.01)

(52) U.S. Cl.
CPC ......... *B60W 10/12* (2013.01); *B60W 2510/08* (2013.01)

(58) Field of Classification Search
CPC ....... B60W 2510/244; B60W 2520/10; B60W 2520/105; B60W 2540/10; B60W 2540/16; B60W 2710/0666; B60W 2710/0677; Y02T 10/62; Y02T 10/72; B60K 6/365; B60K 6/445
See application file for complete search history.

(56) References Cited

U.S. PATENT DOCUMENTS

2016/0347306 A1    12/2016  Oyama
2018/0209534 A1*  7/2018  Takeuchi ................ F16H 59/54

* cited by examiner

CONTROL DEVICE OF HYBRID VEHICLE

This application claims priority from Japanese Patent Application No. 2019-092481 filed on May 15, 2019, the disclosure of which is incorporated herein by reference in its entirety.

FIELD OF THE INVENTION

The present invention relates to a control device of a hybrid vehicle including an engine, a first rotating machine, a second rotating machine, and a differential mechanism.

DESCRIPTION OF THE RELATED ART

A control device of a hybrid vehicle is well known with respect to the hybrid vehicle including an engine, a power transmission device transmitting a power of the engine to drive wheels, an electric transmission mechanism including a differential mechanism constituting a portion of the power transmission device with the engine coupled thereto in a power transmittable manner and a first rotating machine coupled to the differential mechanism in a power transmittable manner such that a differential state of the differential mechanism is controlled by controlling an operation state of the first rotating machine, and a second rotating machine coupled to the drive wheels in a power transmittable manner. For example, this corresponds to a control device of a hybrid vehicle described in Patent Document 1. According to the disclosure of Patent Document 1, during motor running in which the second rotating machine is used as a power source for running with an operation of the engine stopped, the first rotating machine is controlled to output a pressing torque, and the pressing torque is applied to the electric transmission mechanism so as to eliminate a backlash in the electric transmission mechanism, so that occurrence of a rattling noise can be suppressed in the electric transmission mechanism.

PRIOR ART DOCUMENT

Patent Document

Patent Document 1: Japanese Laid-Open Patent Publication No. 2016-222088

SUMMARY OF THE INVENTION

Technical Problem

If a uniform pressing torque is output to the first rotating machine regardless of an electrical angle of the first rotating machine, energy efficiency may deteriorate. Specifically, the first rotating machine generates a cogging torque fluctuating positively and negatively in accordance with rotation. Therefore, when the pressing torque is output from the first rotating machine, shaft torque, i.e. torque on a shaft of the first rotating machine is obtained by adding the cogging torque to the pressing torque. To make the shaft torque in a backlash elimination direction applied to the electric transmission mechanism equal to or greater than torque required for backlash elimination even if the shaft torque is reduced by fluctuations of the cogging torque, the first rotating machine may be driven to output a uniformly large pressing torque corresponding to a maximum value of the cogging torque acting in a direction opposite to the backlash elimination direction. However, for example, in a range of the electrical angle of the first rotating machine in which the cogging torque acts in a direction identical to the backlash elimination direction, this causes the first rotating machine to output an unnecessary large pressing torque, which may result in a deterioration in energy efficiency.

The present invention was conceived in view of the situations and it is therefore an object of the present invention to provide a control device of a hybrid vehicle capable of suppressing deterioration in energy efficiency while properly eliminating a backlash in an electric transmission mechanism when a pressing torque is applied to the electric transmission mechanism during motor running.

Solution to Problem

To achieve the above object, a first aspect of the present invention provides a control device of a hybrid vehicle including (a) an engine, a power transmission device transmitting a power of the engine to drive wheels, an electric transmission mechanism including a differential mechanism constituting a portion of the power transmission device and coupled to the engine in a power transmittable manner and a first rotating machine coupled to the differential mechanism in a power transmittable manner such that a differential state of the differential mechanism is controlled by controlling an operation state of the first rotating machine, and a second rotating machine coupled to the drive wheels in a power transmittable manner, the control device comprising: (b) a pressing torque applying portion configured to control the first rotating machine to output a pressing torque acting in a predetermined backlash elimination direction in backlash elimination in which one of tooth surfaces of meshing gears in the electric transmission mechanism is pressed against the other at a meshing portion during motor running in which the second rotating machine is used as a power source for running with operation of the engine stopped, so that the pressing torque is applied on the electric transmission mechanism, wherein (c) when an electrical angle of the first rotating machine is within a predetermined electrical angle range in which a cogging torque of the first rotating machine generated in accordance with rotation of the first rotating machine is equal to or greater than a predetermined torque required for the backlash elimination in the predetermined backlash elimination direction, the pressing torque applying portion makes the pressing torque smaller as compared to when the electrical angle is outside the predetermined electrical angle range.

A second aspect of the present invention provides the control device of the hybrid vehicle recited in the first aspect of the invention, wherein when the electrical angle of the first rotating machine is within the predetermined electrical angle range, the pressing torque applying portion makes the pressing torque smaller as compared to when the electrical angle is outside the predetermined electrical angle range while the pressing torque is equal to or larger than a predetermined small torque.

A third aspect of the present invention provides the control device of the hybrid vehicle recited in the first aspect of the invention, wherein when the electrical angle of the first rotating machine is within the predetermined electrical angle range, the pressing torque applying portion sets the pressing torque to zero so as to make the pressing torque smaller as compared to when the electrical angle is outside the predetermined electrical angle range.

A fourth aspect of the present invention provides the control device of the hybrid vehicle recited in any one of the first to third aspects of the invention, wherein when the electrical angle of the first rotating machine is outside the predetermined electrical angle range, the pressing torque applying portion applies the pressing torque to the electric transmission mechanism such that a shaft torque of the first rotating machine acting in the predetermined backlash elimination direction and obtained by combining the pressing torque and the cogging torque becomes equal to or greater than the predetermined torque, and wherein when the electrical angle of the first rotating machine is outside the predetermined electrical angle range, the pressing torque applying portion makes the pressing torque smaller, with respect to the cogging torque acting in a direction opposite to the predetermined backlash elimination direction, as the cogging torque becomes smaller.

A fifth aspect of the present invention provides the control device of the hybrid vehicle recited in any one of the first to fourth aspects of the invention, wherein the predetermined backlash elimination direction is a direction in which a rotation speed of the engine is increased by the first rotating machine.

A sixth aspect of the present invention provides the control device of the hybrid vehicle recited in any one of the first to fourth aspects of the invention, wherein the predetermined backlash elimination direction is a direction in which a rotation speed of the engine is reduced by the first rotating machine.

Advantageous Effects of Invention

According to the first aspect of the invention, in the case of controlling the first rotating machine to output the pressing torque acting in the predetermined backlash elimination direction in backlash elimination in the electric transmission mechanism so that the pressing torque is applied to the electric transmission mechanism during the motor running, when the electrical angle of the first rotating machine is within the predetermined electrical angle range in which the cogging torque of the first rotating machine is equal to or greater than the predetermined torque required for the backlash elimination in the predetermined backlash elimination direction, the pressing torque is made smaller as compared to when the electrical angle is outside the predetermined electrical angle range, and therefore, in the range of the electrical angle of the first rotating machine in which the backlash can be eliminated in the electric transmission mechanism by using only the cogging torque of the first rotating machine, the first rotating machine is prevented from outputting an uselessly large pressing torque. Thus, when the pressing torque is applied to the electric transmission mechanism during the motor running, the deterioration in energy efficiency can be suppressed while the backlash is properly eliminated in the electric transmission mechanism.

According to the second aspect of the invention, when the electrical angle of the first rotating machine is within the predetermined electrical angle range, the pressing torque is made smaller as compared to when the electrical angle is outside the predetermined electrical angle range while the pressing torque is equal to or larger than a predetermined small torque, and therefore, when the first rotating machine is controlled to output the pressing torque, application of the minute current tending to increase a control error can be avoided, so that the control accuracy may be prevented from being reduced.

According to the third aspect of the invention, when the electrical angle of the first rotating machine is within the predetermined electrical angle range, the pressing torque is set to zero so as to make the pressing torque smaller as compared to when the electrical angle is outside the predetermined electrical angle range, and therefore, no current is applied to the first rotating machine, and the deterioration in energy efficiency can further be suppressed.

According to the fourth aspect of the invention, when the electrical angle of the first rotating machine is outside the predetermined electrical angle range, the pressing torque is applied to the electric transmission mechanism so that the shaft torque of the first rotating machine acting in the predetermined backlash elimination direction becomes equal to or greater than the predetermined torque, and the pressing torque is made smaller, with respect to the cogging torque acting in the direction opposite to the predetermined backlash elimination direction, as the cogging torque becomes smaller, and therefore, the deterioration in energy efficiency can further be suppressed while the backlash is properly eliminated in the electric transmission mechanism.

According to the fifth aspect of the invention, the predetermined backlash elimination direction is a direction in which the rotation speed of the engine is increased by the first rotating machine, and therefore, for example, the backlash elimination direction does not need to be inverted before start of cranking of the engine by the first rotating machine, so that the start of the engine can immediately be initiated.

According to the sixth aspect of the invention, the predetermined backlash elimination direction is a direction in which the rotation speed of the engine is reduced by the first rotating machine, and therefore, for example, an operation stop process of the engine can be followed by the backlash elimination in the electric transmission mechanism without inverting the backlash elimination direction.

MODES FOR CARRYING OUT THE INVENTION

Examples of the present invention will now be described in detail with reference to the drawings.

Example 1

Figure 1:
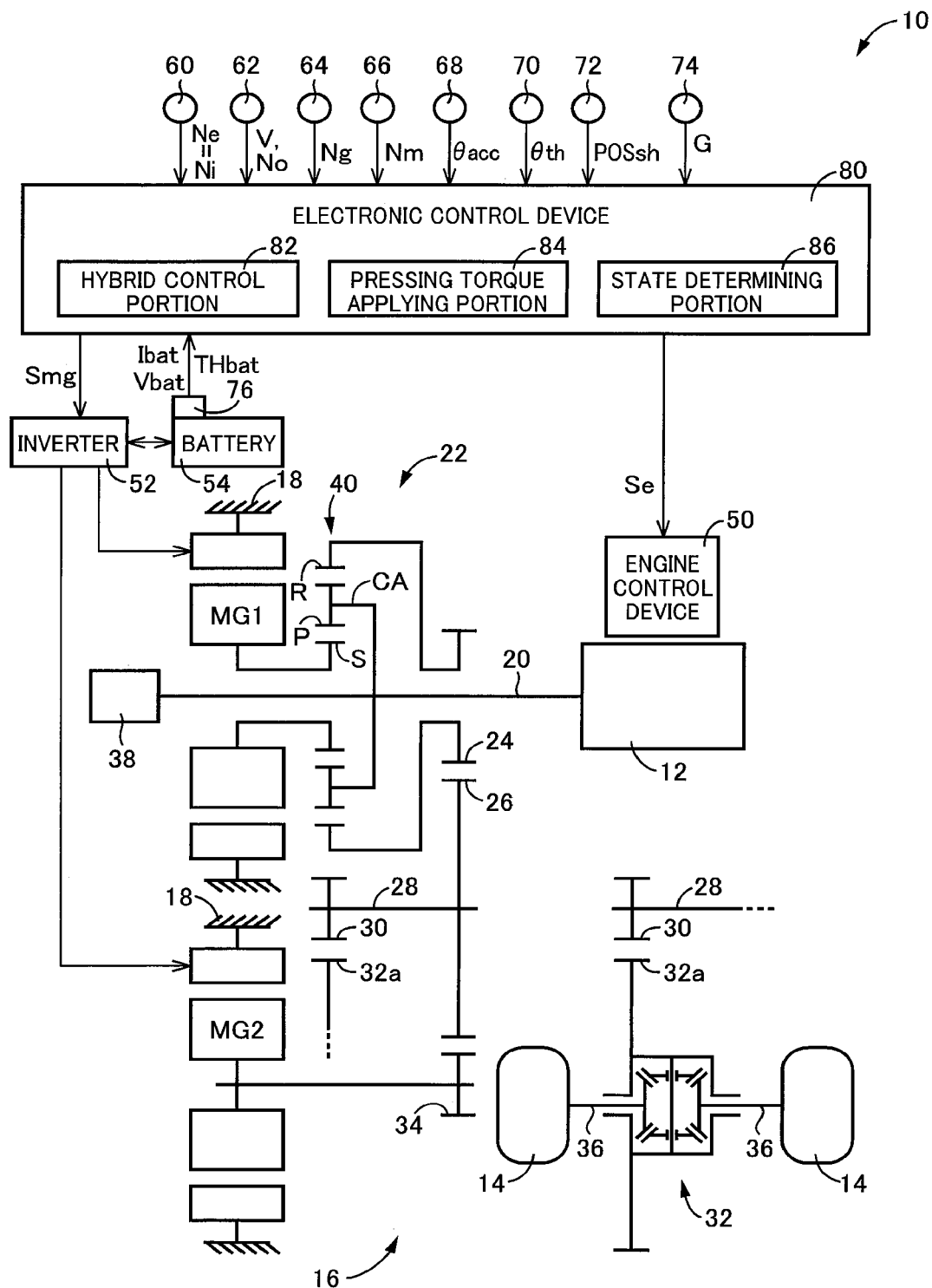
FIG. 1 is a diagram for explaining a general configuration of a vehicle to which the present invention is applied and is a diagram for explaining main portions of a control function and a control system for various controls in the vehicle.

FIG. 1 is a diagram for explaining a general configuration of a vehicle 10 to which the present invention is applied and is a diagram for explaining main portions of a control function and a control system for various controls in the vehicle 10. In FIG. 1, the vehicle 10 includes an engine 12, drive wheels 14, and a power transmission device 16.

The engine 12 is a motive power source for running of the vehicle 10 and is a known internal combustion engine such as a gasoline engine and a diesel engine, for example. The engine 12 has an engine torque Te, which is an output torque of the engine 12, controlled by an electronic control device 80 described later controlling an engine control device 50 such as a throttle actuator, a fuel injection device, and an ignition device included in the vehicle 10.

The power transmission device 16 includes, in a casing 18 serving as a non-rotating member attached to a vehicle body, an input shaft 20, a transmission portion 22, a drive gear 24, a driven gear 26, a driven shaft 28, a final gear 30, a differential gear 32, a reduction gear 34 etc. The input shaft 20 is an input rotating member of the transmission portion 22 and is coupled to the engine 12 directly or indirectly via a damper not shown etc. The transmission portion 22 is coupled to the input shaft 20. The drive gear 24 is an output rotating member of the transmission portion 22. The driven gear 26 is meshed with the drive gear 24. The driven shaft 28 relatively non-rotatably fixes the driven gear 26. The final gear 30 has a smaller diameter than the driven gear 26 and is relatively non-rotatably fixed to the driven shaft 28. The differential gear 32 is meshed with the final gear 30 via a differential ring gear 32a. The reduction gear 34 has a smaller diameter than the driven gear 26 and is meshed with the driven gear 26. A second rotating machine MG2 included in the vehicle 10 is coupled to the reduction gear 34 in a power transmittable manner. The second rotating machine MG2 is a power source for running of the vehicle 10 other than the engine 12. The power transmission device 16 also includes axles 36 coupled to the differential gear 32.

The power transmission device 16 transmits a power output from the engine 12 and a power output from the second rotating machine MG2 to the driven gear 26 and then from the driven gear 26 sequentially through the final gear 30, the differential gear 32, the axles 36, etc. to the drive wheels 14. In this way, the second rotating machine MG2 is coupled to the drive wheels 14 in a power transmittable manner. The vehicle 10 is a hybrid vehicle including the engine 12 and the second rotating machine MG2 as power sources for running. It is noted the power has the same meaning as a torque and a force if not particularly distinguished.

The vehicle 10 includes a mechanical oil pump 38. The oil pump 38 is coupled to the input shaft 20 and is rotationally driven by the engine 12 to supply an oil used for lubrication and cooling of portions of the power transmission device 16.

The transmission portion 22 constitutes a portion of the power transmission device 16 and transmits the power of the engine 12 to the driven gear 26. The transmission portion 22 includes a first rotating machine MG1 and a differential mechanism 40. The differential mechanism 40 is a known single pinion type planetary gear device including a sun gear S, a pinion P, a carrier CA supporting the pinion P in a rotatable and revolvable manner, and a ring gear R meshed with the sun gear S via the pinion P. The sun gear S is coupled to the first rotating machine MG1, the carrier CA is coupled via the input shaft 20 to the engine 12, and the ring gear R is coupled to the drive gear 24. The differential mechanism 40 is a power dividing mechanism mechanically dividing the power of the engine 12 to the first rotating machine MG1 and the drive gear 24. In the differential mechanism 40, the carrier CA functions as an input element, the sun gear S functions as a reaction element, and the ring gear R functions as an output element. The transmission portion 22 is an electric transmission mechanism including the differential mechanism 40 to which the engine 12 is coupled in a power transmittable manner and the first rotating machine MG1 coupled to the differential mechanism 40 in a power transmittable manner, such that a differential state of the differential mechanism 40 is controlled by controlling an operation state of the first rotating machine MG1. Controlling the operation state of the first rotating machine MG1 means providing an operation control of the first rotating machine MG1.

The first rotating machine MG1 and the second rotating machine MG2 are rotating electric machines having a function of an electric motor (motor) and a function of an electric generator (generator) and are so-called motor generators. The first rotating machine MG1 and the second rotating machine MG2 are both coupled via an inverter 52 included in the vehicle 10 to a battery 54 included in the vehicle 10. The first rotating machine MG1 and the second rotating machine MG2 have an MG1 torque Tg and an MG2 torque Tm, which are output torques of the first rotating machine MG1 and the second rotating machine MG2, respectively, controlled by the electronic control device 80 described later controlling the inverter 52. For example, in the case of positive rotation, the output torque of the rotating machine serves as a power running torque when the torque is a positive torque to accelerate the vehicle and as a regenerative torque when the torque is a negative torque to decelerate the vehicle. The battery 54 is an electric storage device giving and receiving an electric power to both the first rotating machine MG1 and second rotating machine MG2.

Figure 2:
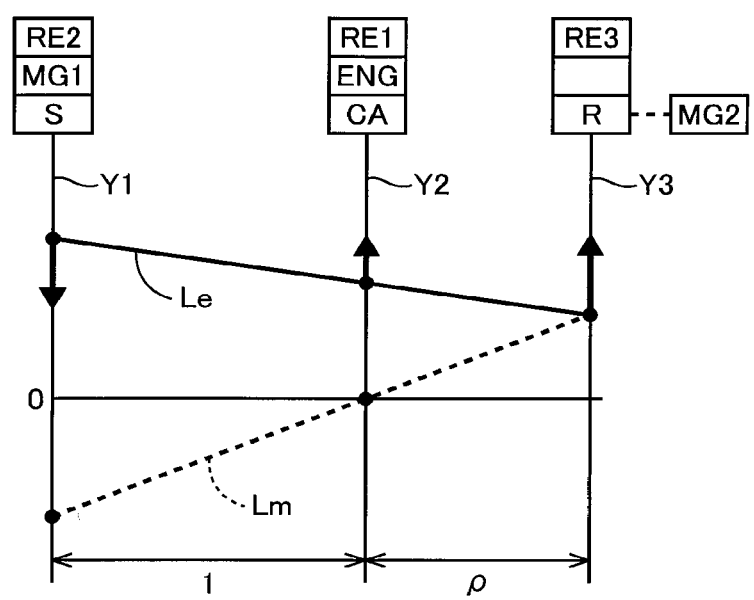
FIG. 2 is an alignment chart representing relative rotation speeds of rotating elements in a transmission portion.

FIG. 2 is an alignment chart representing relative rotation speeds of rotating elements in the transmission portion 22. In FIG. 2, three vertical lines Y1, Y2, Y3 correspond to three rotating elements of the differential mechanism 40 constituting the transmission portion 22. The vertical line Y1 represents the rotation speed of the sun gear S that is a second rotating element RE2 to which the first rotating machine MG1 (see "MG1" of FIG. 2) is coupled. The vertical line Y2 represents the rotation speed of the carrier CA that is a first rotating element RE1 to which the engine 12 (see "ENG" of FIG. 2) is coupled. The vertical line Y3 represents the rotation speed of the ring gear R that is a third rotating element RE3 to which the drive gear 24 is coupled. To the third rotating element RE3, the second rotating machine MG2 (see "MG2" of FIG. 2) is coupled via the driven gear 26, the reduction gear 34, etc. An interval between the vertical lines Y1, Y2, Y3 is determined in accordance with a gear ratio ρ of the differential mechanism 40. When an interval corresponding to "1" is set between the sun gear and the carrier in a relationship between the vertical lines of the alignment chart, an interval corresponding to the gear ratio ρ (=the number Zs of teeth of the sun gear/the number Zr of teeth of the ring gear) is set between the carrier and the ring gear.

A solid line Le of FIG. 2 shows an example of relative speeds of the rotating elements during forward running in a hybrid running mode enabling a hybrid running in which the vehicle runs by using at least the engine 12 as the power source. In this hybrid running mode, when a reaction torque, i.e., a negative torque from the first rotating machine MG1, is input in positive rotation to the sun gear S with respect to the engine torque Te input to the carrier CA in the differential mechanism 40, an engine direct transmission torque Td (=Te/(1+ρ)=−(1/ρ)×Tg) appears in the ring gear R as a positive torque in positive rotation. A combined torque of the engine direct transmission torque Td and the MG2 torque Tm is transmitted as a drive torque in a forward direction of the vehicle 10 depending on a required drive force to the drive wheels 14 via the driven gear 26, the final gear 30, the differential gear 32, etc. In this case, the first rotating machine MG1 functions as an electric generator generating a negative torque in positive rotation. A generated electric power Wg of the first rotating machine MG1 is stored in the battery 54 or consumed by the second rotating machine MG2. The second rotating machine MG2 outputs the MG2 torque Tm by using all or a portion of the generated electric power Wg or using an electric power from the battery 54 in addition to the generated electric power Wg.

The transmission portion 22 may be actuated as an electric continuously variable transmission in which a speed change ratio γ (=input rotation speed Ni/output rotation speed No) is changed. For example, in the hybrid running mode, when the operation state of the first rotating machine MG1 is controlled so as to increase or decrease an MG1 rotation speed Ng, which is the rotation speed of the first rotating machine MG1, i.e., the rotation speed of the sun gear S, with respect to the output rotation speed No, which is the rotation speed of the drive gear 24, restrained by rotation of the drive wheels 14, this increases or decreases the rotation speed of the carrier CA, i.e., an engine rotation speed Ne, which is the rotation speed of the engine 12. Therefore, in the hybrid running, a control can be provided to set an operating point of the engine 12 represented by the engine rotation speed Ne and the engine torque Te to an efficient operating point. This hybrid type is called a machine split type or a split type. The first rotating machine MG1 is a rotating machine capable of controlling the engine rotation speed Ne. The input rotation speed Ni is the rotation speed of the input shaft 20 and has the same value as the engine rotation speed Ne.

A dashed line Lm of FIG. 2 shows an example of the relative speeds of the rotating elements during forward running in a motor running mode enabling a motor running in which the vehicle runs by using the second rotating machine MG2 as the power source while the operation of the engine 12 is stopped. In this motor running mode, the first rotating machine MG1 is brought into a no-load state and is idled in negative rotation, and the carrier CA is not rotated, i.e., the engine rotation speed Ne is set to zero. In this state, only the second rotating machine MG2 is used as the power source, and the MG2 torque Tm acting as a positive torque in positive rotation is transmitted as a drive torque in the forward direction of the vehicle 10 to the drive wheels 14 via the driven gear 26, the final gear 30, the differential gear 32, etc.

Returning to FIG. 1, the vehicle 10 further includes the electronic control device 80 as a controller including a control device of the vehicle 10 related to controlling of the engine 12, the first rotating machine MG1, the second rotating machine MG2, etc. The electronic control device 80 is configured to include a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. The electronic control device 80 is configured to include computers for the engine control, the rotating machine control, etc., as needed.

The electronic control device 80 is supplied with various signals etc. (e.g., the engine rotation speed Ne having the same value as the input rotation speed Ni, the output rotation speed No corresponding to a vehicle speed V, the MG1 rotation speed Ng, MG2 rotation speed Nm that is the rotation speed of the second rotating machine MG2, an accelerator opening degree θacc that is a driver's accelerating operation amount representative of a magnitude of a driver's accelerating operation, a throttle valve opening degree θth that is an opening degree of an electronic throttle valve, an operation position POSsh of a shift operation member included in the vehicle 10, a longitudinal acceleration G of the vehicle 10, a battery temperature THbat, a battery charge/discharge current that, and a battery voltage Vbat of the battery 54) based on detection values from various sensors etc. included in the vehicle 10 (e.g., an engine rotation speed sensor 60, an output rotation speed sensor 62, an MG1 rotation speed sensor 64 such as a resolver, an MG2 rotation speed sensor 66 such as a resolver, an accelerator opening degree sensor 68, a throttle valve opening degree sensor 70, a shift position sensor 72, a G sensor 74, and a battery sensor 76). The electronic control device 80 outputs to the devices included in the vehicle 10 (e.g., the engine control device 50 and the inverter 52) various command signals (e.g., an engine control command signal Se for controlling the engine 12 and a rotating machine control command signal Smg for controlling each of the first rotating machine MG1 and the second rotating machine MG2).

The electronic control device 80 calculates a state-of-charge value SOC [%] as a value indicative of a state of charge of the battery 54 based on the battery charge/discharge current That and the battery voltage Vbat, for example. The electronic control device 80 calculates a rotor position, which is an absolute position of a rotor of the first rotating machine MG1, and determines a rotation direction, based on an output value of the MG1 rotation speed sensor 64. The MG1 rotation speed Ng is a value calculated by the electronic control device 80 based on an amount of change in the rotor position of the first rotating machine MG1 within a certain time. The rotor position of the first rotating machine MG1 corresponds to a mechanical angle. The electronic control device 80 calculates an MG1 electrical angle θem1 [°], which is an electrical angle of the first rotating machine MG1, based on the mechanical angle of the first rotating machine MG1 and the number of magnetic poles of the first rotating machine MG1. The same applies to the MG2 rotation speed Nm and an MG2 electrical angle θem2 [°], which is an electrical angle of the second rotating machine MG2.

To implement the various controls in the vehicle 10, the electronic control device 80 includes a hybrid control means, i.e., a hybrid control portion 82, and a pressing torque applying portion, i.e., a pressing torque applying portion 84.

The hybrid control portion 82 has a function of an engine control means, i.e., an engine control portion, configured to control the actuation of the engine 12, and a function of a rotating machine control means, i.e., a rotating machine control portion, configured to control the actuation of the first rotating machine MG1 and the second rotating machine MG2 via the inverter 52, and provides a hybrid drive control etc. using the engine 12, the first rotating machine MG1, and the second rotating machine MG2 through these control functions.

The hybrid control portion 82 calculates a required drive power Prdem by applying the accelerator opening degree θacc and the vehicle speed V to, for example, a drive force map that is a relationship obtained through experiment or design and stored in advance, i.e., a predefined relationship. From another viewpoint, the required drive power Prdem is a required drive torque Trdem at the current vehicle speed V. The output rotation speed No etc. may be used instead of the vehicle speed V.

The hybrid control portion 82 outputs the engine control command signal Se that is a command signal for controlling the engine 12 and the rotating machine control command signal Smg that is a command signal for controlling the first rotating machine MG1 and the second rotating machine MG2 so as to achieve the required drive power Prdem. The engine control command signal Se is, for example, a command value of an engine power Pe that is the power of the engine 12 outputting the engine torque Te at the current engine rotation speed Ne. The rotating machine control command signal Smg is, for example, a command value of the generated electric power Wg of the first rotating machine MG1 outputting the MG1 torque Tg at the MG1 rotation speed Ng at the time of command output as the reaction torque of the engine torque Te or is a command value of a consumed electric power Wm of the second rotating machine MG2 outputting the MG2 torque Tm at the MG2 rotation speed Nm at the time of command output.

For example, if the transmission portion 22 is actuated as a continuously variable transmission, the hybrid control portion 82 controls the engine 12 and controls the generated electric power Wg of the first rotating machine MG1 so as to attain the engine rotation speed Ne and the engine torque Te at which the engine power Pe achieving the required drive power Prdem is acquired in consideration of an engine optimum fuel consumption point etc. As a result of this control, the speed change ratio γ of the transmission portion 22 actuated as a continuously variable transmission is controlled.

The hybrid control portion 82 selectively establishes the motor running mode or the hybrid running mode as the running mode depending on a running state. For example, the hybrid control portion 82 establishes the motor running mode when the required drive power Prdem is in a motor running region smaller than a predefined threshold value, and establishes the hybrid running mode when the required drive power Prdem is in a hybrid running region equal to or greater than the predefined threshold value. Even when the required drive power Prdem is in the motor running region, the hybrid control portion 82 establishes the hybrid running mode if the state-of-charge value SOC of the battery 54 is less than a predefined engine start threshold value. The engine start threshold value is a predefined threshold value for determining that the state-of-charge value SOC reaches a level at which the engine 12 must forcibly be started for charging the battery 54.

When the hybrid running mode is established while the operation of the engine 12 is stopped, the hybrid control portion 82 provides a start control for starting the engine 12. When starting the engine 12, the hybrid control portion 82 increases the engine rotation speed Ne by the first rotating machine MG1 and causes ignition to start the engine 12 when the engine rotation speed Ne becomes equal to or greater than a predetermined rotation speed at which the ignition can be achieved. Therefore, the hybrid control portion 82 starts the engine 12 by cranking the engine 12 with the first rotating machine MG1.

The first rotating machine MG1 generates a cogging torque fluctuating positively and negatively in accordance with rotation. Therefore, when the first rotating machine MG1 is idled without a load during the motor running, an MG1 cogging torque, i.e., the cogging torque of the first rotating machine MG1, changes a direction in which a backlash is eliminated at a meshing portion of gears i.e., a gear meshing portion in the transmission portion 22, so that a rattling noise may occur.

Figure 7:
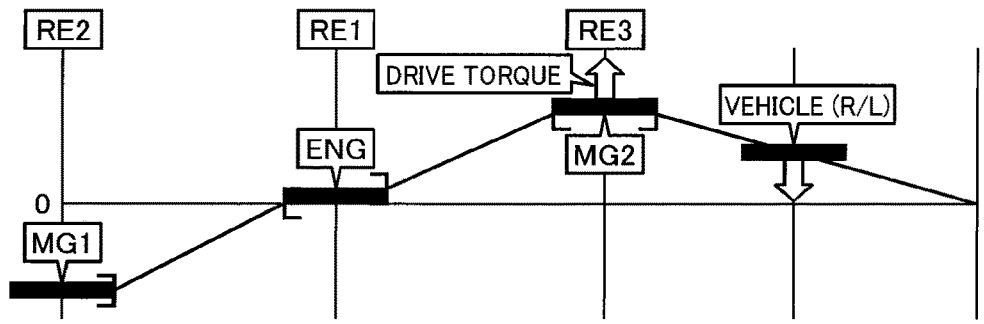
FIG. 7 is a diagram showing an example of an alignment chart during the motor running for explaining the backlash in a gear meshing portion in a power transmission device when the backlash of "MG1" is not eliminated.
Figure 8:
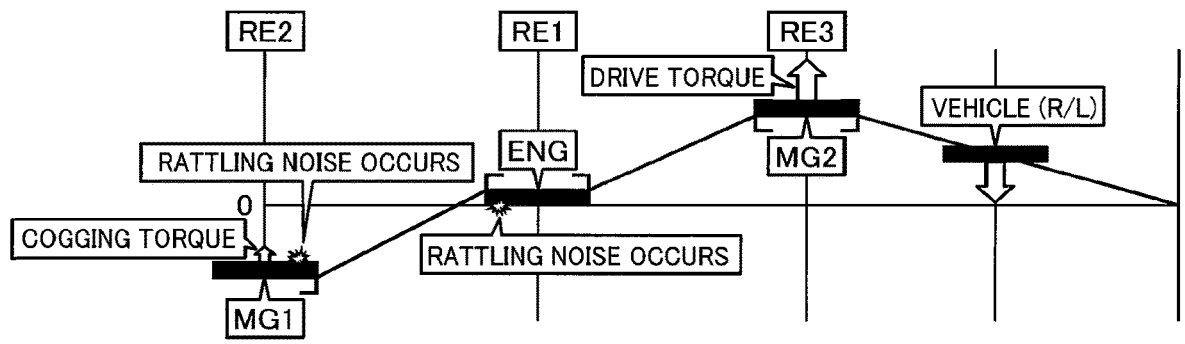
FIG. 8 is a diagram showing an example of an alignment chart during the motor running for explaining the backlash in the gear meshing portion in the power transmission device when the backlash of "MG1" is eliminated by a positive MG1 cogging torque.
Figure 9:
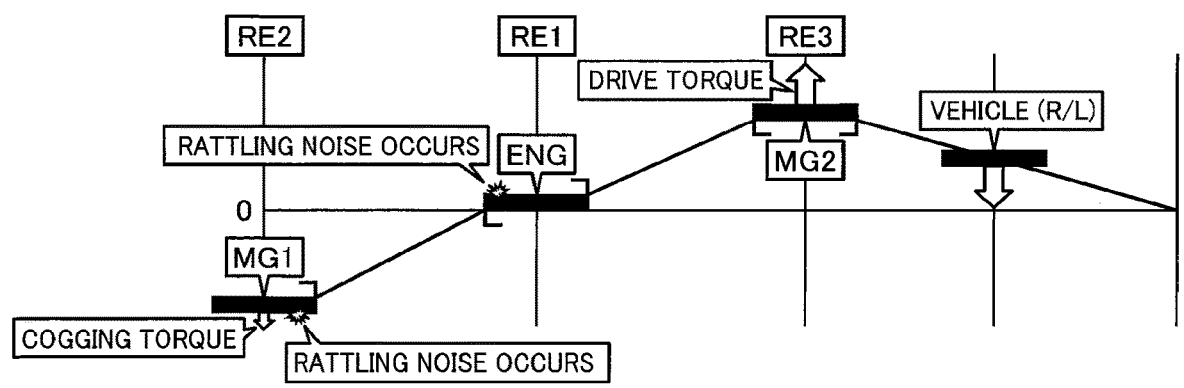
FIG. 9 is a diagram showing an example of an alignment chart during the motor running for explaining the backlash in the gear meshing portion in the power transmission device when the backlash of "MG1" is eliminated toward the opposite side as compared to FIG. 8 by a negative MG1 cogging torque.

FIGS. 7, 8, and 9 each show an alignment chart (collinear chart) during the motor running for explaining the backlash in the gear meshing portion in the power transmission device 16. In FIGS. 7 to 9, black rectangular portions tagged with "MG1", "ENG", "MG2" represent relative rotation speeds of the rotating elements in the transmission portion 22 as in FIG. 2, respectively. Rectangular portions tagged with "VEHICLE (R/L)" represent relative rotation speeds of the rotating elements in a reduction portion such as the final gear 30 or the differential gear 32. "VEHICLE (R/L)" denotes a road load (road resistance) of the vehicle 10. Each backlash is shown in a simplified manner at an end portion or each of end portions of each of the rectangular portions tagged with "MG1", "ENG", and "MG2". FIG. 7 shows a state in which the backlashes of "MG2" and "ENG" are eliminated by the motor running while the backlash of "MG1" is not eliminated. FIG. 8 shows a state in which the backlash of "MG1" is eliminated by the positive MG1 cogging torque, in a direction in which the engine rotation speed Ne increases. In this case, a rattling noise may occur. FIG. 9 shows a state in which the first rotating machine MG1 is further rotated from the state of FIG. 8 and the backlash of "MG1" is eliminated by the negative MG1 cogging torque, in a direction in which the engine rotation speed Ne decreases. Also in this case, a rattling noise may occur. It is desirable to suppress the occurrence of such a rattling noise caused by separation of tooth surfaces in the gear meshing portion in the transmission portion 22.

The pressing torque applying portion 84 suppresses the rattling noise by eliminating a backlash by pressing one of tooth surfaces against the other in the gear meshing portion in the transmission portion 22 during the motor running. Specifically, during the motor running, the pressing torque applying portion 84 controls the first rotating machine MG1 to output a pressing torque acting in a predetermined backlash elimination direction in backlash elimination in the transmission portion 22 and applies the pressing torque to the transmission portion 22.

For example, the predetermined backlash elimination direction is a direction in which the engine rotation speed Ne is increased by the first rotating machine MG1 (see the state of FIG. 8). For example, the direction in which the engine rotation speed Ne is increased is the same as the direction at the time of cranking of the engine 12 by the first rotating machine MG1. Therefore, since the backlash is eliminated in the direction in which the engine rotation speed Ne is increased while the operation of the engine 12 is stopped, the backlash elimination direction does not need to be inverted before the start of cranking of the engine 12 by the first rotating machine MG1, so that the start of the engine 12 can immediately be initiated.

Alternatively, for example, the predetermined backlash elimination direction is a direction in which the engine rotation speed Ne is reduced by the first rotating machine MG1 (see the state of FIG. 9). For example, the direction in which the engine rotation speed Ne is reduced is the same as the direction at the time of control in which a torque for reducing the engine rotation speed Ne is applied by the first rotating machine MG1 to the engine 12 so that the engine rotation speed Ne can quickly pass through a resonance range while the operation of the engine 12 is stopped. Therefore, since the predetermined backlash elimination direction is set to the direction in which the engine rotation speed Ne is reduced by the first rotating machine MG1, an operation stop process of the engine 12 can be followed by the backlash elimination in the transmission portion 22 without inverting the backlash elimination direction.

When the backlash is eliminated, a torque obtained by combining the pressing torque output from the first rotating machine MG1 and the MG1 cogging torque is the shaft torque of the first rotating machine MG1, i.e., an MG1 shaft torque (=the MG1 cogging torque+the pressing torque). The MG1 shaft torque at the time of backlash elimination is desirably not less than a predetermined torque Tpre required for the backlash elimination in the predetermined backlash elimination direction, for example and not more than a torque at a level not changing the engine rotation speed Ne. To make the MG1 shaft torque equal to or greater than the predetermined torque Tpre, the first rotating machine MG1 may be driven to output a uniformly large pressing torque equal to or greater than a torque obtained by adding to the predetermined torque Tpre a torque in the backlash elimination direction having a magnitude corresponding to the maximum value of the MG1 cogging torque acting in the direction opposite to the backlash elimination direction. However, particularly, in a range of the MG1 electrical angle θem1 in which the MG1 cogging torque acting in the backlash elimination direction becomes equal to or greater than the predetermined torque Tpre, this causes the first rotating machine MG1 to output an unnecessary large pressing torque, which may result in a deterioration in energy efficiency. The deterioration in energy efficiency is desirably suppressed while the backlash is properly eliminated in the transmission portion 22. The predetermined torque Tpre is a predefined lower limit torque of the MG1 shaft torque for preventing a tooth surface separation in the gear meshing portion in the transmission portion 22. Therefore, a torque region of the MG1 shaft torque less than the predetermined torque Tpre is a tooth-surface-separation-occurring torque region in which the tooth surface separation occurs.

The electronic control device 80 further includes a state determining means, i.e., a state determining portion 86, for implementing a control function of suppressing deterioration in energy efficiency while properly eliminating the backlash in the transmission portion 22.

The state determining portion 86 determines whether the motor running mode is established. Specifically, the state determining portion 86 determines whether the motor running is being performed, i.e., whether an EV running is being performed.

The state determining portion 86 determines whether the MG1 electrical angle θem1 is within a predetermined electrical angle range in which the MG1 cogging torque is equal to or greater than the predetermined torque Tpre required for eliminating the backlash in the predetermined backlash elimination direction. The MG1 cogging torque fluctuating in accordance with the MG1 electrical angle θem1 is comprehended in advance through design or experiment. The predetermined electrical angle range is a predefined range of the MG1 electrical angle θem1 in which such an MG1 cogging torque is equal to or greater than the predetermined torque Tpre.

When the MG1 electrical angle θem1 is within the predetermined electrical angle range, the MG1 shaft torque equal to or greater than the predetermined torque Tpre can be ensured by only the MG1 cogging torque. When the state determining portion 86 determines that the motor running mode is established, and the state determining portion 86 determines that the MG1 electrical angle θem1 is within the predetermined electrical angle range, the pressing torque applying portion 84 makes the pressing torque from the first rotating machine MG1, which is applied to the transmission portion 22 and acts in the predetermined backlash elimination direction, smaller as compared to when the electrical angle is outside the predetermined electrical angle range. In this example, a profile A refers to a characteristic of change in the pressing torque applied to the transmission portion 22 when the MG1 electrical angle θem1 is within the predetermined electrical angle range.

Considering the energy efficiency, the pressing torque in the profile A is preferably as small as possible. When the state determining portion 86 determines that the MG1 electrical angle θem1 is within the predetermined electrical angle range, for example, the pressing torque applying portion 84 sets the pressing torque from the first rotating machine MG1 to zero and thereby makes the pressing torque from the first rotating machine MG1 smaller as compared to when the electrical angle is outside the predetermined electrical angle range. Therefore, the profile A is a characteristic of change in the pressing torque maintained at zero, for example.

When the MG1 electrical angle θem1 is outside the predetermined electrical angle range, the MG1 shaft torque equal to or greater than the predetermined torque Tpre cannot be ensured by the MG1 cogging torque alone. Therefore, the pressing torque from the first rotating machine MG1 acting in the predetermined backlash elimination direction needs to be applied to the transmission portion 22 to ensure the MG1 shaft torque equal to or greater than the predetermined torque Tpre. When the state determining portion 86 determines that the motor running mode is established, and the state determining portion 86 determines that the MG1 electrical angle θem1 is outside the predetermined electrical angle range, the pressing torque applying portion 84 applies the pressing torque from the first rotating machine MG1 acting in the predetermined backlash elimination direction to the transmission portion 22 so that the MG1 shaft torque acting in the predetermined backlash elimination direction becomes equal to or greater than the predetermined torque Tpre. In this example, a profile B refers to a characteristic of change in the pressing torque applied to the transmission portion 22 when the MG1 electrical angle θem1 is outside the predetermined electrical angle range.

Considering the energy efficiency, the pressing torque in the profile B is preferably as small as possible. When the state determining portion 86 determines that the MG1 electrical angle θem1 is outside the predetermined electrical angle range, for example, the pressing torque applying portion 84 makes the pressing torque from the first rotating machine MG1 smaller, with respect to the MG1 cogging torque acting in the direction opposite to the predetermined backlash elimination direction, as the MG1 cogging torque becomes smaller. For example, the profile B is a characteristic of change in the pressing torque setting the MG1 shaft torque acting in the predetermined backlash elimination direction to the predetermined torque Tpre.

Figure 3:
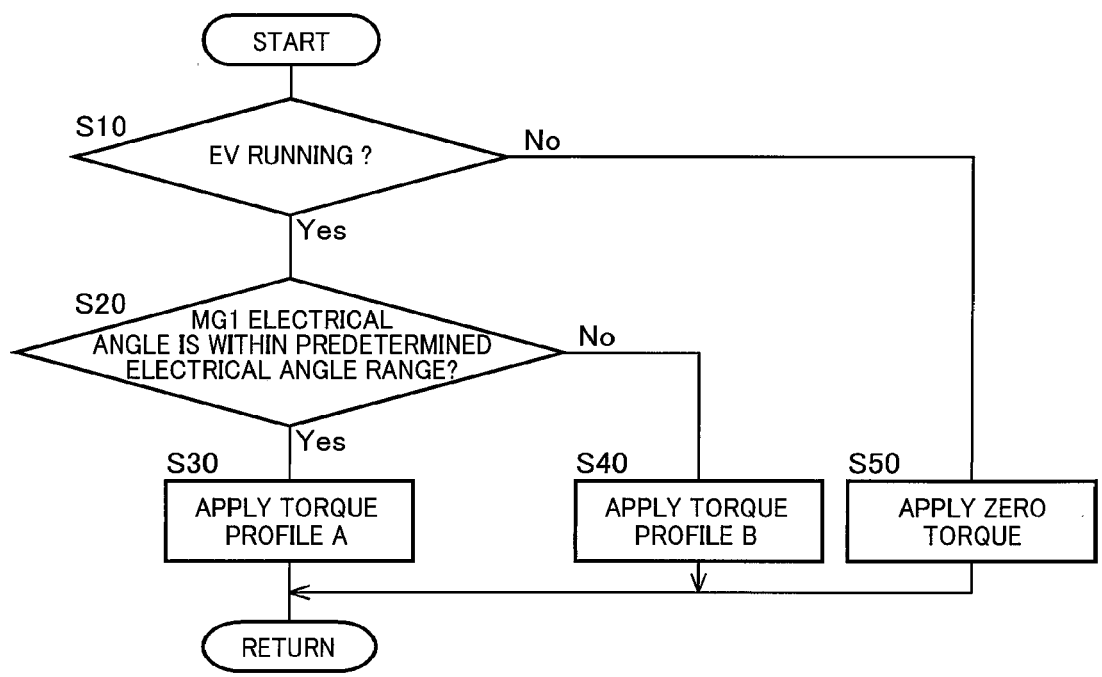
FIG. 3 is a flowchart for explaining a main portion of control actuation of an electronic control device, i.e., control actuation for suppressing deterioration in energy efficiency while properly eliminating a backlash in the transmission portion when a pressing torque is applied to the transmission portion during motor running.
Figure 4:
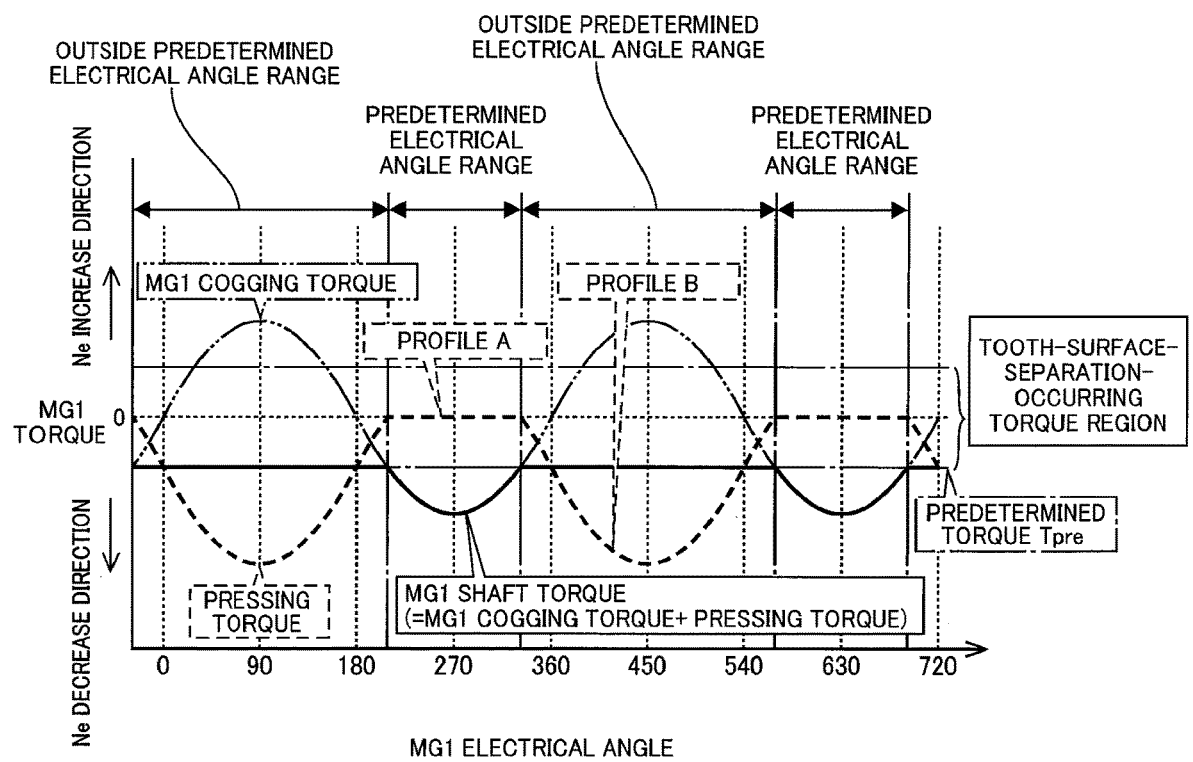
FIG. 4 is a diagram showing an example of a time chart when the control actuation shown in the flowchart of FIG. 3 is performed.

FIG. 3 is a flowchart for explaining a main portion of control actuation of the electronic control device 80, i.e., control actuation for suppressing deterioration in energy efficiency while properly eliminating the backlash in the transmission portion 22 when the pressing torque is applied to the transmission portion 22 during the motor running, and is repeatedly executed, for example. FIG. 4 is a diagram showing an example of a time chart when the control actuation shown in the flowchart of FIG. 3 is performed.

In FIG. 3, first, at a step (hereinafter, step is omitted) S10 corresponding to the function of the state determining portion 86, it is determined whether the motor running mode is established, i.e., whether the EV running is being performed. If the determination of S10 is affirmative, it is determined at S20 corresponding to the function of the state determining portion 86 whether the MG1 electrical angle θem1 is within the predetermined electrical angle range. If the determination of S20 is affirmative, the pressing torque applied to the transmission portion 22 is set to the profile A at S30 corresponding to the function of the pressing torque applying portion 84. If the determination of S20 is negative, the pressing torque applied to the transmission portion 22 is set to the profile B at S40 corresponding to the function of the pressing torque applying portion 84. If the determination of S10 is negative, the pressing torque is not applied, i.e., the pressing torque applied to the transmission portion 22 is set to zero, at S50 corresponding to the function of the pressing torque applying portion 84.

FIG. 4 shows an example of the case that the pressing torque from the first rotating machine MG1 is applied to the transmission portion 22 in the direction in which the engine rotation speed Ne is reduced during the motor running. FIG. 4 shows the motor running at a constant vehicle speed V, and the MG1 electrical angle θem1 is proportional to time. In FIG. 4, when the pressing torque from the first rotating machine MG1 is not applied to the transmission portion 22, and the MG1 cogging torque indicated by a dashed-two dotted line enters the tooth-surface-separation-occurring torque region for the backlash of "MG1", the tooth surface separation occurs in the gear meshing portion, which causes a rattling noise when the backlash is eliminated again (see FIGS. 7 to 9). Therefore, it is necessary to apply the pressing torque for preventing the MG1 shaft torque from entering the tooth-surface-separation-occurring torque region. The pressing torque indicated by a thick broken line is an example of the pressing torque for preventing the MG1 shaft torque from entering the tooth-surface-separation-occurring torque region. When the MG1 electrical angle θem1 is within the predetermined electrical angle range, the pressing torque from the first rotating machine MG1 is made smaller as compared to when the MG1 electrical angle θem1 is outside the predetermined electrical angle range. For example, when the MG1 electrical angle θem1 is within the predetermined electrical angle range, the pressing torque from the first rotating machine MG1 is fixed to zero as indicated by the profile A, and only the MG1 cogging torque is used for achieving the MG1 shaft torque, i.e., for achieving the backlash elimination. Since the pressing torque from the first rotating machine MG1 is set to zero, the energy efficiency is improved. In this case, if the operation of the inverter 52 for the first rotating machine MG1 is stopped, the energy efficiency is further improved. When the MG1 electrical angle θem1 is outside the predetermined electrical angle range, the pressing torque from the first rotating machine MG1 is applied so that the MG1 shaft torque is outside the tooth-surface-separation-occurring torque region. For example, when the MG1 electrical angle θem1 is outside the predetermined electrical angle range, the pressing torque from the first rotating machine MG1 is applies so that the MG1 shaft torque is set to the predetermined torque Tpre as shown in the profile B. As shown in the profiles A, B, the pressing torque is applied asymmetrically on the positive and negative sides in accordance with a phase of the fluctuating MG1 cogging torque.

As described above, according to this example, in the case of controlling the first rotating machine MG1 to output the pressing torque acting in the predetermined backlash elimination direction in backlash elimination in the transmission portion 22 so that the pressing torque is applied to the transmission portion 22 during the motor running, when the MG1 electrical angle θem1 is within the predetermined electrical angle range in which the MG1 cogging torque is equal to or greater than the predetermined torque Tpre required for eliminating the backlash in the predetermined backlash elimination direction, the pressing torque is made smaller as compared to when the MG1 electrical angle θem1 is outside the predetermined electrical angle range, and therefore, in the range of the MG1 electrical angle θem1 in which the backlash can be eliminated in the transmission portion 22 by using only the MG1 cogging torque, the first rotating machine MG1 is prevented from outputting an uselessly large pressing torque. Thus, when the pressing torque is applied to the transmission portion 22 during the motor running, the deterioration in energy efficiency can be suppressed while the backlash is properly eliminated in the transmission portion 22.

According to this example, when the MG1 electrical angle θem1 is within the predetermined electrical angle range, the pressing torque from the first rotating machine MG1 is set to zero to make the pressing torque from the first rotating machine MG1 smaller as compared to when the MG1 electrical angle θem1 is outside the predetermined electrical angle range, and therefore, no current is applied to the first rotating machine MG1, and the deterioration in energy efficiency can further be suppressed.

According to this example, when the MG1 electrical angle θem1 is outside the predetermined electrical angle range, the pressing torque from the first rotating machine MG1 is applied to the transmission portion 22 so that the MG1 shaft torque acting in the predetermined backlash elimination direction becomes equal to or greater than the predetermined torque Tpre, and the pressing torque from the first rotating machine MG1 is made smaller, with respect to the MG1 cogging torque acting in the direction opposite to the predetermined backlash elimination direction, as the MG1 cogging torque becomes smaller, and therefore, the deterioration in energy efficiency can further be suppressed while the backlash is properly eliminated in the transmission portion 22.

Other examples of the present invention will be described. In the following description, the portions common to the examples are denoted by the same reference numerals and will not be described.

Example 2

In Example 1 described above, in the profile B of the pressing torque from the first rotating machine MG1, a minute current is applied to the first rotating machine MG1 in the vicinity of the profile A so as to set the pressing torque to a minute torque close to zero. Applying the minute current to the first rotating machine MG1 by the inverter 52 results in a large control error due to, for example, influences of a dead time of the first rotating machine MG1 and an accuracy of a current sensor, so that a current control accuracy is reduced. In this example, in the profile B, a predetermined small torque Tmin is used as a lower limit when the pressing torque from the first rotating machine MG1 is applied. The predetermined small torque Tmin is a minimum value predefined as the MG1 torque Tg at which the current control accuracy is hardly reduced in the inverter 52, for example. When the MG1 torque Tg is set to zero, the operation of the inverter 52 can be stopped, and therefore, a zero value of torque is excluded from a region less than the predetermined small torque Tmin.

Figure 5:
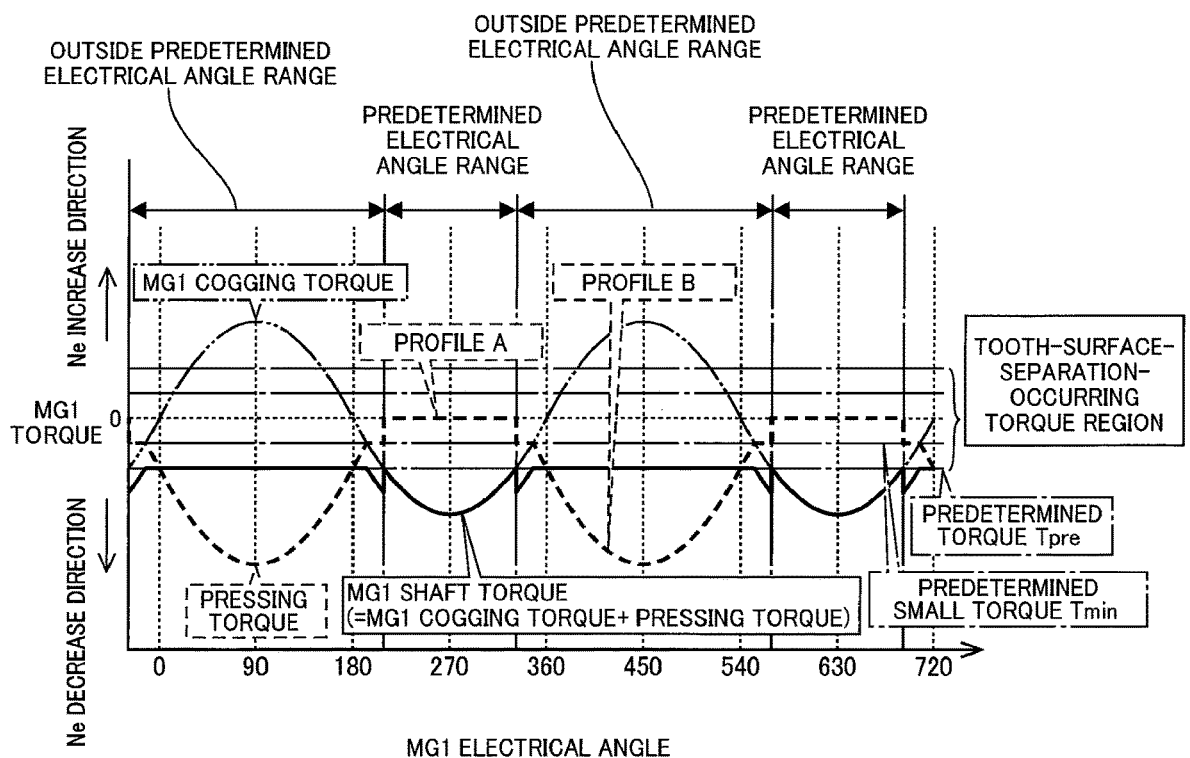
FIG. 5 is a diagram showing an example of a time chart when the control actuation shown in the flowchart of FIG. 3 is performed, and is a diagram showing an example different from FIG. 4.

FIG. 5 is a diagram showing an example of a time chart when the control actuation shown in the flowchart of FIG. 3 is performed, and is a diagram showing an example different from FIG. 4. FIG. 5 shows an example of the case that the pressing torque from the first rotating machine MG1 is applied to the transmission portion 22 in the direction in which the engine rotation speed Ne is reduced during the motor running as in FIG. 4. In FIG. 5, when the MG1 electrical angle θem1 is outside the predetermined electrical angle range, basically, the pressing torque from the first rotating machine MG1 is applied so that the MG1 shaft torque is set to the predetermined torque Tpre as shown in the profile B. However, the predetermined small torque Tmin is used as the lower limit for applying the pressing torque from the first rotating machine MG1. For example, in the vicinity of the profile A, the pressing torque in the profile B is maintained at the predetermined small torque Tmin. At a boundary between the profile A and the profile B, the pressing torque is switched between the predetermined small torque Tmin and zero.

According to this example, the same effects as the first example can be obtained.

Example 3

In Example 1 described above, in the profile A of the pressing torque from the first rotating machine MG1, the pressing torque from the first rotating machine MG1 is set to zero, so that the pressing torque from the first rotating machine MG1 is made smaller as compared to when the electrical angle is outside the predetermined electrical angle range. In the profile A, the pressing torque from the first rotating machine MG1 may be made smaller as compared to when the electrical angle is outside the predetermined electrical angle range, and the pressing torque does not necessarily need to be zero. However, as described in Example 2, the current control accuracy in the inverter 52 must be taken into consideration. In this example, when the state determining portion 86 determines that the MG1 electrical angle θem1 is within the predetermined electrical angle range, for example, the pressing torque applying portion 84 makes the pressing torque from the first rotating machine MG1 smaller as compared to when the MG1 electrical angle θem1 is outside the predetermined electrical angle range while the pressing torque is equal to or larger than the predetermined small torque Tmin.

Figure 6:
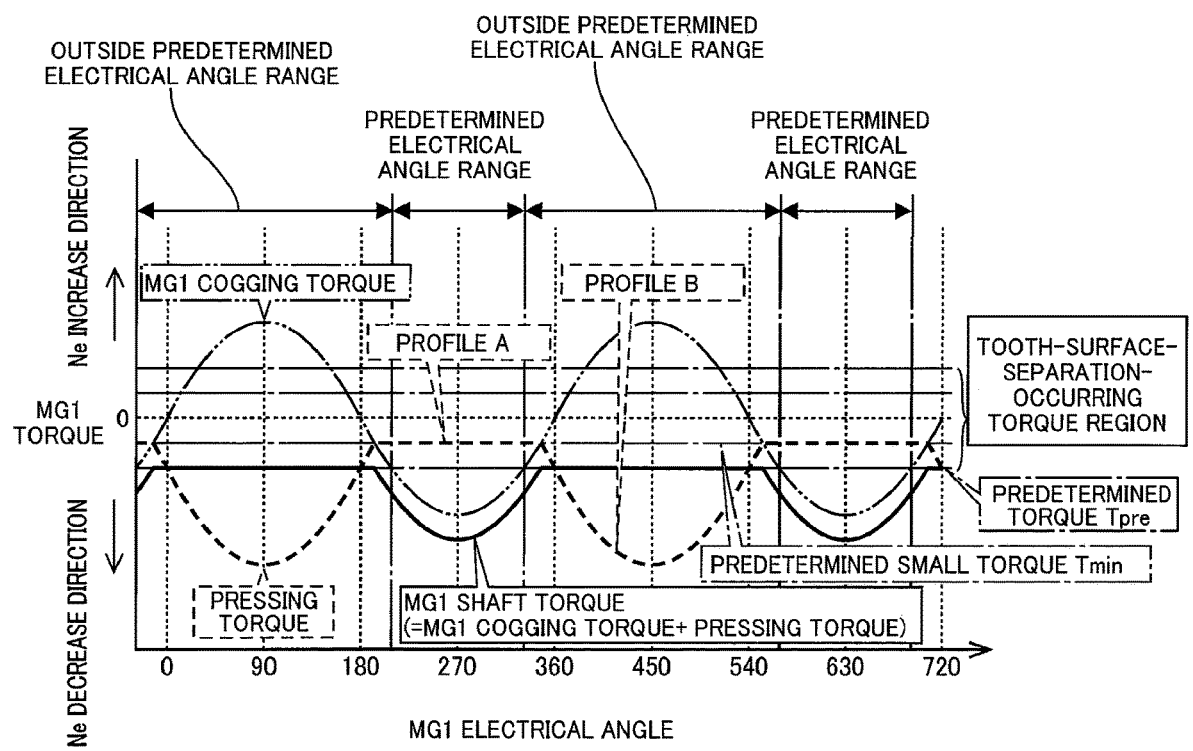
FIG. 6 is a diagram showing an example of a time chart when the control actuation shown in the flowchart of FIG. 3 is performed, and is a diagram showing an example different from FIGS. 4 and 5.

FIG. 6 is a diagram showing an example of a time chart when the control actuation shown in the flowchart of FIG. 3 is performed, and is a diagram showing an example different from FIGS. 4 and 5. FIG. 6 shows an example of the case that the pressing torque from the first rotating machine MG1 is applied to the transmission portion 22 in the direction in which the engine rotation speed Ne is reduced during the motor running as in FIG. 4. In FIG. 6, when the MG1 electrical angle θem1 is within the predetermined electrical angle range, the predetermined small torque Tmin is used as the lower limit for applying the pressing torque from the first rotating machine MG1. For example, when the MG1 electrical angle θem1 is within the predetermined electrical angle range, the pressing torque from the first rotating machine MG1 is fixed to the predetermined small torque Tmin as shown in the profile A. Even when the MG1 electrical angle θem1 is outside the predetermined electrical angle range, the predetermined small torque Tmin is used as the lower limit for applying the pressing torque from the first rotating machine MG1. For example, when the MG1 electrical angle θem1 is outside the predetermined electrical angle range, the pressing torque from the first rotating machine MG1 is applied so that the MG1 shaft torque is set to the predetermined torque Tpre as shown in the profile B; however, in the vicinity of the profile A, the pressing torque is fixed to the predetermined small torque Tmin in accordance with the profile A.

According to this example, as in Example 1 described above, in the case of applying the pressing torque from the first rotating machine MG1 to the transmission portion 22 during the motor running, when the MG1 electrical angle θem1 is within the predetermined electrical angle range, the pressing torque is made smaller as compared to when the MG1 electrical angle θem1 is outside the predetermined electrical angle range, and therefore, the deterioration in energy efficiency can be suppressed while the backlash is properly eliminated in the transmission portion 22.

According to this example, when the MG1 electrical angle θem1 is within the predetermined electrical angle range, the pressing torque is made smaller as compared to when the MG1 electrical angle θem1 is outside the predetermined electrical angle range while the pressing torque is equal to or larger than a predetermined small torque, and therefore, when the first rotating machine MG1 is controlled to output the pressing torque, application of the minute current tending to increase a control error can be avoided, so that the control accuracy may be prevented from being reduced.

Although the examples of the present invention have been described in detail with reference to the drawings, the present invention is also applicable in other forms.

For example, in the examples, the transmission portion 22 may be a transmission mechanism in which a differential operation may be limited by controlling a clutch or a brake coupled to a rotating element of the differential mechanism 40. The differential mechanism 40 may be a double pinion type planetary gear device. The differential mechanism 40 may be a differential mechanism having four or more rotating elements due to multiple planetary gear devices coupled to each other. The differential mechanism 40 may be a differential gear device in which the first rotating machine MG1 and the drive gear 24 are respectively coupled to a pinion rotationally driven by the engine 12 and a pair of bevel gears meshed with the pinion. The differential mechanism 40 may be a mechanism having a configuration in which two or more planetary gear devices are coupled to each other by some of rotating elements constituting the devices such that an engine, a rotating machine, and drive wheels are coupled to the rotating elements of these planetary gear devices in a power transmittable manner.

The above description is merely an embodiment and the present invention can be implemented in variously modified and improved forms based on the knowledge of those skilled in the art.

REFERENCE SIGNS LIST

10: vehicle (hybrid vehicle)
12: engine
14: drive wheels
16: power transmission device
22: transmission portion (electric transmission mechanism)
40: differential mechanism
80: electronic control device (control device)
84: pressing torque applying portion
MG1: first rotating machine
MG2: second rotating machine

What is claimed is:

1. An electronic control device of a hybrid vehicle including an engine, a power transmission device transmitting a power of the engine to drive wheels, an electric transmission mechanism including a differential mechanism constituting a portion of the power transmission device and coupled to the engine in a power transmittable manner and a first rotating machine coupled to the differential mechanism in a power transmittable manner such that a differential state of the differential mechanism is controlled by controlling an operation state of the first rotating machine, and a second rotating machine coupled to the drive wheels in a power transmittable manner, the electronic control device comprising:

a pressing torque applying controller configured to control the first rotating machine to output a pressing torque acting in a predetermined backlash elimination direction in backlash elimination in which one of tooth surfaces of meshing gears in the electric transmission mechanism is pressed against the other at a meshing portion during motor running in which the second rotating machine is used as a power source for running with operation of the engine stopped, so that the pressing torque is applied on the electric transmission mechanism, wherein when an electrical angle of the first rotating machine that is determined based on an output of a rotation speed sensor is within a predetermined electrical angle range in which a cogging torque of the first rotating machine generated in accordance with rotation of the first rotating machine is equal to or greater than a predetermined torque required for the backlash elimination in the predetermined backlash elimination direction, the pressing torque applying controller makes the pressing torque smaller as compared to when the electrical angle is outside the predetermined electrical angle range.

2. The electronic control device of the hybrid vehicle according to claim 1, wherein when the electrical angle of the first rotating machine is within the predetermined electrical angle range, the pressing torque applying controller makes the pressing torque smaller as compared to when the electrical angle is outside the predetermined electrical angle range while the pressing torque is equal to or larger than a predetermined small torque.

3. The electronic control device of the hybrid vehicle according to claim 2, wherein when the electrical angle of the first rotating machine is outside the predetermined electrical angle range, the pressing torque applying controller applies the pressing torque to the electric transmission mechanism such that a shaft torque of the first rotating machine acting in the predetermined backlash elimination direction and obtained by combining the pressing torque and the cogging torque becomes equal to or greater than the predetermined torque, and wherein when the electrical angle of the first rotating machine is outside the predetermined electrical angle range, the pressing torque applying controller makes the pressing torque smaller, with respect to the cogging torque acting in a direction opposite to the predetermined backlash elimination direction, as the cogging torque becomes smaller.

4. The electronic control device of the hybrid vehicle according to claim 3, wherein the predetermined backlash elimination direction is a direction in which a rotation speed of the engine is increased by the first rotating machine.

5. The electronic control device of the hybrid vehicle according to claim 3, wherein the predetermined backlash elimination direction is a direction in which a rotation speed of the engine is reduced by the first rotating machine.

6. The electronic control device of the hybrid vehicle according to claim 2, wherein the predetermined backlash elimination direction is a direction in which a rotation speed of the engine is increased by the first rotating machine.

7. The electronic control device of the hybrid vehicle according to claim 2, wherein the predetermined backlash elimination direction is a direction in which a rotation speed of the engine is reduced by the first rotating machine.

8. The electronic control device of the hybrid vehicle according to claim 1, wherein when the electrical angle of the first rotating machine is within the predetermined electrical angle range, the pressing torque applying controller sets the pressing torque to zero so as to make the pressing torque smaller as compared to when the electrical angle is outside the predetermined electrical angle range.

9. The electronic control device of the hybrid vehicle according to claim 8, wherein when the electrical angle of the first rotating machine is outside the predetermined electrical angle range, the pressing torque applying controller applies the pressing torque to the electric transmission mechanism such that a shaft torque of the first rotating machine acting in the predetermined backlash elimination direction and obtained by combining the pressing torque and the cogging torque becomes equal to or greater than the predetermined torque, and wherein when the electrical angle of the first rotating machine is outside the predetermined electrical angle range, the pressing torque applying controller makes the pressing torque smaller, with respect to the cogging torque acting in a direction opposite to the predetermined backlash elimination direction, as the cogging torque becomes smaller.

10. The electronic control device of the hybrid vehicle according to claim 9, wherein the predetermined backlash elimination direction is a direction in which a rotation speed of the engine is increased by the first rotating machine.

11. The electronic control device of the hybrid vehicle according to claim 9, wherein the predetermined backlash elimination direction is a direction in which a rotation speed of the engine is reduced by the first rotating machine.

12. The electronic control device of the hybrid vehicle according to claim 8, wherein the predetermined backlash elimination direction is a direction in which a rotation speed of the engine is increased by the first rotating machine.

13. The electronic control device of the hybrid vehicle according to claim 8, wherein the predetermined backlash elimination direction is a direction in which a rotation speed of the engine is reduced by the first rotating machine.

14. The electronic control device of the hybrid vehicle according to claim 1, wherein
when the electrical angle of the first rotating machine is outside the predetermined electrical angle range, the pressing torque applying controller applies the pressing torque to the electric transmission mechanism such that a shaft torque of the first rotating machine acting in the predetermined backlash elimination direction and obtained by combining the pressing torque and the cogging torque becomes equal to or greater than the predetermined torque, and wherein
when the electrical angle of the first rotating machine is outside the predetermined electrical angle range, the pressing torque applying controller makes the pressing torque smaller, with respect to the cogging torque acting in a direction opposite to the predetermined backlash elimination direction, as the cogging torque becomes smaller.

15. The electronic control device of the hybrid vehicle according to claim 14, wherein the predetermined backlash elimination direction is a direction in which a rotation speed of the engine is increased by the first rotating machine.

16. The electronic control device of the hybrid vehicle according to claim 14, wherein the predetermined backlash elimination direction is a direction in which a rotation speed of the engine is reduced by the first rotating machine.

17. The electronic control device of the hybrid vehicle according to claim 1, wherein the predetermined backlash elimination direction is a direction in which a rotation speed of the engine is increased by the first rotating machine.

18. The electronic control device of the hybrid vehicle according to claim 1, wherein the predetermined backlash elimination direction is a direction in which a rotation speed of the engine is reduced by the first rotating machine.

* * * * *